No. 742,812. PATENTED OCT. 27, 1903.
A. WINTON.
GEARING.
APPLICATION FILED JUNE 13, 1902.
NO MODEL. 2 SHEETS—SHEET 1.

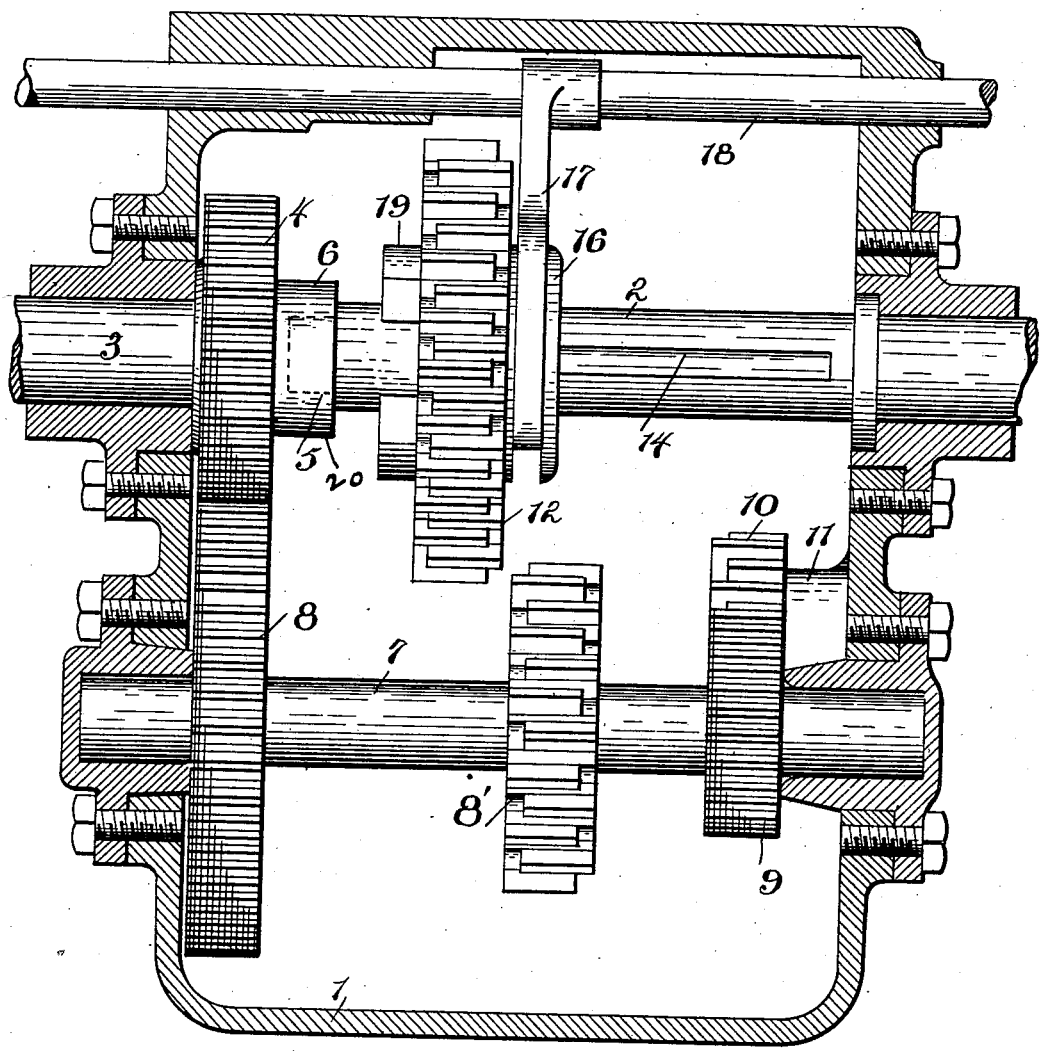

No. 742,812.

Patented October 27, 1903.

UNITED STATES PATENT OFFICE.

ALEXANDER WINTON, OF CLEVELAND, OHIO.

GEARING.

SPECIFICATION forming part of Letters Patent No. 742,812, dated October 27, 1903.

Application filed June 13, 1902. Serial No. 111,557. (No model.)

*To all whom it may concern:*

Be it known that I, ALEXANDER WINTON, a citizen of the United States, residing at Cleveland, in the county of Cuyahoga and State of Ohio, have invented new and useful Improvements in Gearing, of which the following is a specification.

My invention relates to improvements in gears; and it pertains to a gear which is especially adapted and intended for use in connection with automobiles for the purpose of throwing the driving mechanism in and out of gear, changing speed, and for reversing purposes, though it may be used in other connections in which the same or similar functions or operations are desirable.

The object of my invention is to so construct a gear that it will smoothly engage a coacting gear for throwing in operation the mechanism or for changing the speed or for reversing, which operation necessitates the throwing in and out of mesh coacting gears.

Figure 1:
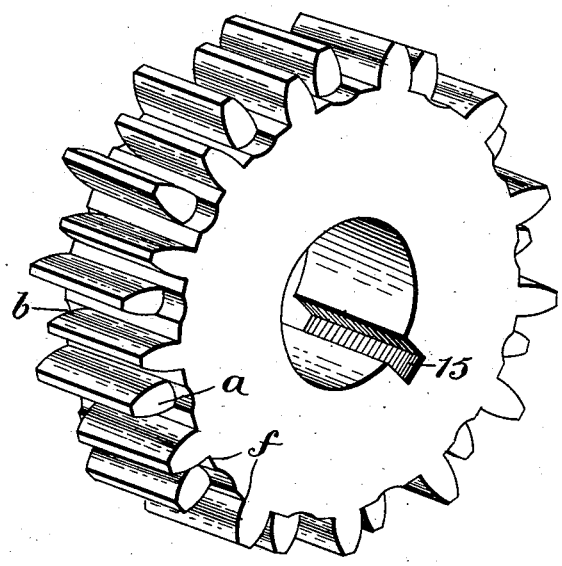
Figure 2:
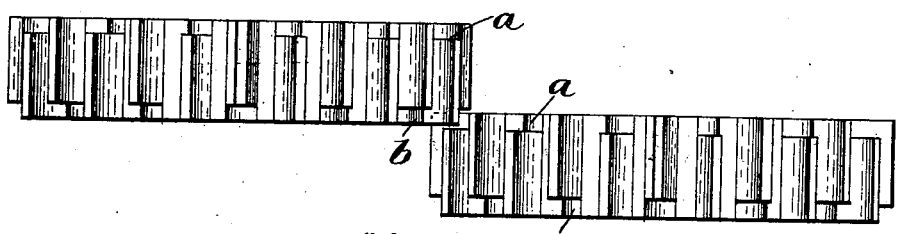
Figure 3:
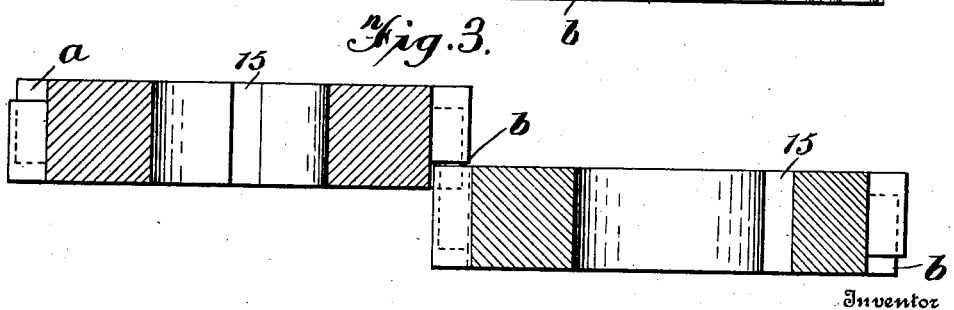

In the accompanying drawings, Figure 1 is a perspective view of my improved gear. Fig. 2 is a top or edge view of two gears, showing them in the act of being thrown into gear or mesh. Fig. 3 is a transverse sectional view of two of my improved gears, showing them in the act of being moved into mesh with each other. Fig. 4 is a plan view of a throw in and out gear mechanism, a reverse, and a changing gear mechanism for the purpose of illustrating the utility and operation of my invention when applied to automobiles and in similar situations.

Referring now to the drawings, 1 indicates a suitable frame, in which the gearing is supported. Supported in this frame is a drive or engine shaft, which is composed of the two coaxial portions 2 and 3. The power or the engine piston, as the case may be, is applied to the end 3 of the said drive-shaft, and this portion or part 3 of the drive or engine shaft has rigidly secured to it a gear-wheel 4. The adjacent end of the part or portion 2 of the drive or engine shaft stops at the point 5 (indicated by dotted lines) and is journaled in the adjacent end of the part 3 or in flange or projection 6 upon the gear 4, which is provided with a clutch member 20. Also journaled within the frame 1 is a counter-shaft 7, and this counter-shaft 7 is provided with a gear 8, which is constantly in mesh or engagement with the gear 4 of the part 3 of the engine or drive shaft. Secured rigidly to the counter-drive shaft 7 is a gear 8', and also secured rigidly to the counter-shaft 7 is a gear 9. A pinion 10 is suitably supported upon a stub-shaft or support 11 and is in constant engagement with the gear 9.

Placed upon the part 2 of the engine or drive shaft is a gear 12, and this gear 12 has a longitudinal movement upon the part 2 of the said engine or drive shaft, but is locked against rotation in respect to the shaft through the medium of a suitable rib or feather 14, which engages a groove formed in the central opening of the gear-wheel 12, such as that illustrated, for instance, at 15 in Fig. 1 and which is well understood by mechanics.

The gear 12 is provided at one side with a grooved collar 16, in the groove of which engages an arm 17, the said arm 17 being carried by a sliding rod 18. This sliding rod 18 will be operated by any suitable connection (not here shown) within reach of the operator for the purpose of moving the gear 12 in a longitudinal direction back and forth upon the part 2 of the engine or drive shaft and by means of which the throw in and out mechanism and the speed and reverse mechanisms are controlled, as will be fully explained hereinafter. The opposite side of the gear 12 is provided with a clutch member 19, adapted to engage a corresponding clutch member 20, carried by the gear 4, which, as before stated, is rigidly connected with the part 3 of the engine or drive shaft. When the gear 12 is moved so as to throw its clutch member 19 in engagement with the clutch member 20, it will be readily understood that the part 2 of the engine or drive shaft will be positively locked to the part 3 and will rotate in unison therewith or at a corresponding speed. When, however, it is desired to transmit motion from the driving part 3 of the engine or drive shaft through the gears 8, 8', 9, 10, and 12 to the part 2 of the said shaft for the purpose of either changing the relative speed of the part 2 as compared with the part 3 or for the purpose of changing the direction of rotation of the part 2 in respect to the part 3, the wheel or gear 12 is moved in engagement, respectively, with either the gear 8' or the gear 10. When the gear 12 is moved in engagement with the gear 8', the part 2 of the said engine or drive shaft will be rotated at a relatively lower speed than the part 3 through the intervention of the gear 4, 8, 8', and 12. When the gear 12 is moved in engagement with the pinion 10, then the part 2 of the engine or drive shaft will be revolved in a direction opposite to the direction of the part 3 of the shaft for the purpose of reversing the direction of the vehicle, and the said part 2 will also revolve at a relatively lower speed as compared with the speed of the part 3.

So far as I am aware, where gear-wheels have been thrown laterally or sidewise into mesh with each other the ends of the gear-teeth have heretofore been beveled for the purpose of furnishing a slight clearance to permit them to be thrown into mesh. However, this beveling of the ends of the teeth to provide the said clearance only aggravates the difficulty of throwing the gears into mesh by a sidewise movement, because the beveled ends of the teeth will tend to force the gears apart and they will have a tendency to slip, which causes generally a great clattering of the teeth and is very injurious to the parts and unsatisfactory.

By means of my improved gear I provide a clearance for the teeth of the gears in moving them sidewise or laterally into mesh, which provides a square or abrupt or positive engagement of the teeth, absolutely preventing any tendency of the teeth to slip or any tendency to force the gear sidewise, and preventing absolutely the clattering and injury to the parts occasioned by the tapering of the ends of the teeth in the usual manner.

This improvement consists in cutting away a part of every other tooth of the gear at that side of the teeth with which it is desired to engage the gear. If it is desired to have the gear engage from both sides or directions, then the ends of every other tooth of the gear at both sides thereof will be cut away, as shown specifically and clearly at $a$ and $b$ in Figs. 1, 2, and 3. It will be understood, of course, that if a pair of gears are to operate only from one side then it will only be necessary to cut away a portion of every other tooth at one side of the gear—for instance, as in the case of the pinion 10, Fig. 3—since the gear 12 is to operate only with one side of the pinion 10. When every other tooth is partly cut away, as shown in Figs. 1, 2, and 3 and also as shown in the gears 12 and 8', Fig. 3, the teeth are arranged in what might be aptly termed a "staggering" relation. When, however, the teeth are cut away at only one side of the gear, as shown in the pinion of Fig. 3, then the teeth are simply shown in an overlapping relative arrangement.

As clearly illustrated in Figs. 2 and 3, when gears constructed according to my invention as just explained, the overlapping teeth of one gear will pass between two overlapping teeth of the adjacent gear, and which provides a clearance equal to the space between two teeth—for instance, as clearly shown at $f$, Fig. 1, and as is also clearly shown when the teeth are so placed, a square, positive, or straight abutment for the teeth is provided, which has no tendency whatever to slip or to force the gear sidewise, but which serves to cause them to slide easily and noiselessly to mesh one with the other, as has been clearly demonstrated by the operation of this invention in connection with motor-carriages.
A gear of this construction is found to be of exceeding utility in motor-carriages, where the gears are thrown into and out of mesh for the purpose of changing speed or reversing or for connecting or disconnecting the mechanism. It will be noted that when the gears are thrown into or out of mesh with another gear for the purpose of changing speed, the gears are in effect a connecting and disconnecting device. The same is also true when they are being thrown into and out of gear for the purpose of reversing the driven mechanism. When the gears are in their normal engagement, all of the teeth of each gear are in operation; but when the gears are in the act of being thrown into gear for the space or period of time necessary to move the distance of the cut-away portions of the teeth only every other tooth is in engagement; but under the revolution of the parts, they being thrown positively into engagement with square abutting shoulders, they slide easily and smoothly into absolute and complete mesh one with the other without any tendency to slip or to force the gears sidewise or to clatter.

By cutting away the end of every other tooth, as here shown, I find in practice that the gears will smoothly pass into and out of positive mesh.

Having thus described my invention, what I claim, and desire to secure by Letters Patent, is—

1. A gearing comprising two coacting relatively laterally movable gears, the ends of every other tooth at one side of one gear adapted to overlap the adjacent ends of adjacent teeth for the purpose described.

2. A gearing comprising two coacting relatively laterally movable gears, both gears at adjacent sides having the ends of every other tooth adapted to overlap the adjacent ends of adjacent teeth, substantially as described.

3. A gearing comprising two coacting gears having a relative lateral movement, each gear having the ends of alternate teeth at adjacent sides cut away, whereby the gears will smoothly slide into mesh by a lateral movement.

4. A gearing comprising two gears as 8' and
10, the ends of adjacent teeth of the gear 8' being cut away at opposite sides thereof substantially as shown, and the ends of alternate teeth of the gear 10 cut away at the side adjacent the gear 8', and a third gear 12 having opposite ends of adjacent teeth cut away substantially as shown, the gears being relatively laterally movable, whereby the gear 12 can be made to engage the gear 8' from opposite sides and the gear 10 at the side adjacent the gear 8'.

In testimony whereof I have hereunto set my hand in the presence of two subscribing witnesses.

ALEXANDER WINTON.

Witnesses:
GEO. H. BROWN,
F. W. FOX.